United States Patent
Makita

[11] Patent Number: 6,154,290
[45] Date of Patent: *Nov. 28, 2000

[54] COMMUNICATION APPARATUS AND FACSIMILE APPARATUS

[75] Inventor: Hiroshi Makita, Chiba, Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/001,006

[22] Filed: Dec. 30, 1997

[30] Foreign Application Priority Data

Jan. 24, 1997 [JP] Japan .................................. 9-010764

[51] Int. Cl.$^7$ ..................................................... H04N 1/40
[52] U.S. Cl. ............................................................. 358/440
[58] Field of Search ...................... 358/403, 404, 358/405, 407, 434, 435, 436, 437, 438, 439, 440, 442, 443; 379/100.01, 100.06, 100.09, 100.14, 100.17, 102.02

[56] References Cited

U.S. PATENT DOCUMENTS

| 5,282,238 | 1/1994 | Berland ...................................... 379/58 |
| 5,877,871 | 3/1999 | Smith ....................................... 358/442 |

FOREIGN PATENT DOCUMENTS

| 724355 | 7/1996 | European Pat. Off. ....... H04N 1/333 |
| 5-183707 | 7/1993 | Japan ............................... H04N 1/121 |
| 5-227401 | 9/1993 | Japan ................................. H04N 1/32 |
| 2286739 | 8/1923 | United Kingdom .............. H04N 1/32 |
| WO9206556 | 4/1992 | WIPO ............................... H04N 1/32 |

*Primary Examiner*—Jerome Grant, II

[57] ABSTRACT

A facsimile apparatus having a memory transmission function which enables a reply to a facsimile-transmitted original to be automatically reminded of at predetermined period of time. When transmission to a receiving side facsimile apparatus requiring a reminder is performed, the memory transmission function stores image data transmitted as data used for reminding the receiving side facsimile apparatus of a reply in an image data storing section. Additionally, the memory transmission function stores the telephone number and called subscriber identification number of the receiving side facsimile apparatus, the time of the transmission to the receiving side facsimile apparatus, the expected time of reception, the number of retransmissions, and the address number of the image in a transmission data storing section. When the facsimile transmitted original is replied to in the form of a transmission from the receiving side facsimile apparatus, the data used for reminding the stored facsimile apparatus of a reply is erased. Where no reply from the receiving side facsimile apparatus is received, or when any of the expected times of reception stored in the transmission data storing section exceeds the present time, a main control section performs dialing based on the telephone number corresponding to the expected time of reception, and then transmits the image data corresponding to that telephone number.

17 Claims, 5 Drawing Sheets

SEPTEMBER 20, 20:00

| RECEIVING SIDE APPARATUS'S TELEPHONE NUMBER | ID NO. | TIME OF TRANSMISSION | EXPECTED TIME OF RECEPTION | NUMBER OF RETRANSMISSIONS | ADDRESS NO. |
|---|---|---|---|---|---|
| 0000000000 | 0000000000 | SEPTEMBER 20, 10:20 | SEPTEMBER 21, 10:20 | 2 | ...... |
| 0000000000 | 0000000000 | SEPTEMBER 20, 15:20 | SEPTEMBER 21, 15:20 | 2 | ...... |
|  |  |  |  |  |  |

FIG. 5B

SEPTEMBER 21, 18:00

| RECEIVING SIDE APPARATUS'S TELEPHONE NUMBER | ID NO. | TIME OF TRANSMISSION | EXPECTED TIME OF RECEPTION | NUMBER OF RETRANSMISSIONS | ADDRESS NO. |
|---|---|---|---|---|---|
| 0000000 | 0000000 | SEPTEMBER 21, 15:20 | SEPTEMBER 22, 15:20 | 1 | ...... |
|  |  |  |  |  |  |
|  |  |  |  |  |  |

FIG. 5C

SEPTEMBER 22, 16:00

| RECEIVING SIDE APPARATUS'S TELEPHONE NUMBER | ID NO. | TIME OF TRANSMISSION | EXPECTED TIME OF RECEPTION | NUMBER OF RETRANSMISSIONS | ADDRESS NO. |
|---|---|---|---|---|---|
|  |  |  |  |  |  |
|  |  |  |  |  |  |
|  |  |  |  |  |  |

COMMUNICATION APPARATUS AND FACSIMILE APPARATUS

BACKGROUND OF THE INVENTION

1. Field of the Invention

The present invention relates to facsimile apparatuses and communication apparatus having a memory transmission function.

2. Description of the Related Art

Conventionally, as a function of reading out and transmitting an original being set at an original feeding section, some facsimile apparatuses have a readout transmission function in which, after the line to a receiving side facsimile apparatus is connected, the transmission of the image data is performed while the readout of the original by the reading section and the generation of image data are being performed in real time. And other facsimile apparatuses have a memory transmission function in which, after the readout of the original by the reading section and the generation of image data are performed and the generated image data is temporarily stored in a memory, transmission of image data is performed.

A facsimile apparatus having the memory transmission function is described in Japanese Unexamined Patent Publication, JP-A 5-183707 (1993). In this facsimile apparatus, in the case where the transmission of image data using the memory transmission function is stopped in the middle, page numbers are prevented from being overlapped when the image data is retransmitted. Image data representative of the page numbers is then added to the image data of the original and stored in a memory immediately after the original is read out and the image data of the original is generated. The image data stored in the memory is transmitted to the receiving side facsimile apparatus.

Another facsimile apparatus is described in Japanese Unexamined Patent Publication JP-A 5-227401 (1993). In this facsimile apparatus, to prevent a not-yet-read-out original from being left in the midst of a transmission when a transmission error is caused in transmitting an image signal using the readout transmission function, the not-yet-read-out original is read out and the image data of the original is in a memory. The image data stored in the memory is then retransmitted to the receiving side facsimile apparatus. The process for generating and transmitting image data will be referred to as facsimile transmission.

However, in the conventional apparatuses, in the case where a reply from the receiving side is required after facsimile transmission, (i.e. in the case where, for example, the facsimile-transmitted original requires a reply), when no reply is sent from the receiving side before the period for reply expires, it is necessary for the user to remind the receiving side of a reply to the facsimile-transmitted original by calling the receiving side, or by facsimile-transmitting the same original again. This requires the user to perform complicated operations which waste time.

SUMMARY OF THE INVENTION

An object of the invention is to provide a communication apparatus and a facsimile apparatus capable of automatically reminding the receiving side of a reply to an original of which period for reply has expired or will expire soon without troubling the user.

The invention provides a communication apparatus comprising:

transmitting unit for transmitting to a receiving side communication apparatus a first signal representative of information to be transmitted;

storage unit for storing an identification number for identifying the receiving side communication apparatus and the first signal transmitted to the receiving side communication apparatus so as to correspond to each other;

sensing unit for sensing an incoming second signal transmitted from the receiving side communication apparatus; and controlling unit for controlling the transmitting unit to retransmit to the receiving side communication apparatus the first signal stored in the storage unit so as to correspond to the identification number of the receiving side communication apparatus when the incoming of the second signal is not sensed by the sensing unit within a predetermined reference time from the time of the transmission of the first signal by the transmitting means.

According to the invention, when the first signal is transmitted by the transmitting unit, the identification number of the receiving side communication apparatus and the first signal are stored in the storage unit so as to correspond to each other. Thereafter, when the incoming of the second signal from the receiving side communication apparatus is not sensed within the reference time, it is determined that there is no reply to the information transmitted through the first signal from the user of the receiving side communication apparatus and the transmitting unit is caused to retransmit the first signal. With this feature, a reply to the information transmitted through the first signal is automatically reminded of.

The invention provides a facsimile apparatus comprising:

transmitting unit for transmitting an image signal to a receiving side facsimile apparatus;

storage unit for storing an identification number for identifying the receiving side facsimile apparatus and the image signal transmitted to the receiving side facsimile apparatus so as to correspond to each other;

sensing unit for sensing incoming of a signal transmitted from the receiving side facsimile apparatus; and controlling unit for controlling the transmitting unit to retransmit to the receiving side facsimile apparatus the image signal stored in the storage unit so as to correspond to the identification number of the receiving side facsimile apparatus, to the receiving side facsimile apparatus, when the incoming of the signal is not sensed by the sensing unit within a predetermined reference time from the time of the transmission of the image signal by the transmitting means.

According to the invention, when facsimile transmission of an original is performed by the transmitting unit, the identification number associated with the facsimile transmission and the transmitted image signal are stored in the storage unit so as to correspond to each other. Thereafter, when the incoming of the signal is not sensed by the sensing unit within the reference time, it is determined that there is no reply from the receiving side facsimile apparatus and the controlling unit causes the image signal to be retransmitted to the receiving side. With this feature, a reply to the facsimile-transmitted original is automatically reminded of.

Thus, according to the invention, when there is no reply to the information transmitted through the image signal from the receiving side facsimile apparatus within the reference time after the facsimile transmission, the facsimile apparatus automatically retransmits the image signal to the receiving side. As a result, a reply to the facsimile-transmitted original may be reminded of without the user performing complicated operations or wasting time.

The invention is characterized in that the storage unit of the facsimile apparatus stores as the identification number a called subscriber identification signal received in a facsimile control procedure for transmitting the image signal, and the sensing unit compares a transmitting subscriber identification signal which is transmitted from the receiving side facsimile apparatus and received in a facsimile control procedure for receiving the image signal, with the called subscriber identification signal stored in the storage unit, to thereby determine whether the transmitting subscriber identification signal is transmitted from the receiving side facsimile apparatus or not, and when it is determined that the transmitting subscriber identification signal is transmitted from the receiving side facsimile apparatus, the sensing unit determines that the incoming of the signal takes place.

According to the invention, when facsimile transmission is performed by the transmitting unit, the called subscriber identification number received in the facsimile control procedure associated with the facsimile transmission and the transmitted image signal are stored in the storage unit so as to correspond to each other. Thereafter, when the sensing unit does not sense that a transmitting subscriber identification signal which is transmitted from the receiving side communication apparatus and coincides with the stored called subscriber identification signal received in the facsimile communication procedure associated with the facsimile reception within the reference time, it is determined that there is no reply from the receiving side facsimile apparatus and the controlling unit causes the image signal to be retransmitted to the receiving side. With this feature, the facsimile-transmitted original may be automatically reminded of the reply.

The sensing unit uses as a method of sensing whether there is a reply from the receiving side or not the called subscriber identification number and the transmitting subscriber identification number which is transmitted from the receiving side and received in the facsimile control procedures. With this feature, it is more accurately sensed whether or not there is a reply from the receiving side facsimile apparatus transmitted through facsimile transmission.

The invention is characterized in that when the incoming of the signal is not sensed by the sensing unit within the predetermined reference time from the time of the retransmission of the image signal by the transmitting unit, the controlling unit of the facsimile apparatus causes the transmitting unit to retransmit the image signal to the receiving side facsimile apparatus again.

According to the invention, when facsimile transmission of an original is performed by the transmitting unit, the receiver number associated with the facsimile transmission and the transmitted image signal are stored in the storage unit so as to correspond to each other. Thereafter, when the incoming of the signal from the receiving side facsimile apparatus is not sensed by the sensing unit within the reference time, the controlling unit causes the image signal to be retransmitted to the receiving side. When the incoming of the signal from the receiving side facsimile apparatus is not sensed by the sensing unit within the reference time from the retransmission of the image signal, the controlling unit causes the retransmission of the image signal to the receiving side to be performed again. With this feature, the reminding can be automatically repeated until there is a reply to the facsimile-transmitted original. Thus, the facsimile apparatus automatically transmits the same image signal to the receiving side every predetermined period of time until there is a reply to the information transmitted through the transmitted image signal from the receiving side. As a result, the reminding can be repeated until there is a reply to the facsimile-transmitted original without the user performing complicated operations or wasting time.

The invention is characterized in that when the retransmission of the image signal is repeated a predetermined reference number of times or more, the controlling unit of the facsimile apparatus erases the image signal and the identification number stored in the storage unit.

According to the invention, the controlling unit of the facsimile apparatus repeats the retransmission of the image signal and counts the number of repetitions and when the number of repetitions becomes the reference number of times or greater, the controlling unit erases the image signal and the identification number from the storage unit. Consequently, the retransmission of the image signal is not performed thereafter. With this feature, the facsimile apparatus is prevented from excessively repeating the retransmission of the image signal even when there is no reply to the information transmitted through the image signal.

The invention is characterized in that the facsimile apparatus further comprises reference number of times inputting unit for inputting the reference number of times, and the controlling unit controls the retransmission of the image signal based on the reference number of times inputted by the reference number of times inputting unit.

According to the invention, the controlling unit controls the number of retransmissions of the image signal based on the reference number of times inputted by the reference number of times inputting unit. With this feature, the number of retransmissions of the image signal can be arbitrarily set by the user. Consequently, the degree to which a reply to the information transmitted through the image signal is reminded of can be freely set, (i.e., for example, according to the period for the reply) or the importance of the reply.

The invention is characterized in that the facsimile apparatus further comprises reference time inputting unit for inputting the reference time, and the controlling unit controls timing of the retransmission of the image signal based on the reference time inputted by the reference time inputting unit.

According to the invention, the controlling unit controls the timing of the retransmission of the image signal based on the time inputted by the reference time inputting unit. With this feature, the timing of the retransmission of the image signal can be arbitrarily set by the user of the facsimile apparatus. Consequently, the degree to which a reply to the information transmitted through the image signal is reminded of can be freely set according to the period for the reply or the importance of the reply.

The invention is characterized in that the storage unit of the facsimile apparatus stores a telephone number dialed by the transmitting unit to establish a communication channel with the receiving side facsimile apparatus, as the identification number, and the sensing unit compares a caller's telephone number included in caller information received to establish the communication channel, with the telephone number stored in the storage unit, to thereby determine whether the caller information is transmitted from the receiving side facsimile apparatus or not and, when it is determined that the caller information is transmitted from the receiving side facsimile apparatus, the sensing unit determines that the incoming of the signal take place.

According to the invention, when facsimile transmission is performed by the transmitting unit, the telephone number used for the dialing to establish a communication channel in the facsimile transmission and the transmitted image signal are stored in the storage unit so as to correspond to each other. Thereafter, when the sensing unit does not sense that the caller information including a caller's telephone number the same as the stored telephone number is received within the reference time, it is determined that there is no reply from the receiving side facsimile apparatus and the controlling unit causes the transmitting unit to retransmit the image signal to the receiving side facsimile apparatus. Consequently, the information transmitted through the image signal can be automatically reminded of the reply.

Moreover, whether there is a reply or not is determined by use of the telephone number used for establishing the communication channel. For this reason, when the receiving side facsimile apparatus has a telephone and the reply is made through the telephone, the sensing unit can also sense that the signal is received in response to the transmission and reception of the signal used for establishing the communication channel for the call. Consequently, whether the reply is made through the telephone or facsimile transmission, the presence or absence of the reply can be sensed. With this feature, the presence or absence of the reply from the receiving side facsimile apparatus may be sensed more accurately.

The invention is characterized in that the facsimile apparatus further comprises a selector for selecting whether the retransmission of the image signal is performed or not, and
when the selector means selects to perform the retransmission of the image signal, the storage unit stores the image signal and the identification number every time the transmitting means transmits the image signal, and when the selector means selects not to perform the retransmission, the image signal and the identification number are not stored.

According to the invention, the storage unit of the facsimile apparatus switches whether the image signal and the identification number are stored or not according to a result of selection by the selector. When the image signal and the identification number are stored, the sensing unit and the controlling unit retransmits the image signal according to the presence or absence of the reply from the receiving side facsimile apparatus, and when the image signal and the identification number are not stored, the sensing unit and the controlling unit do not perform the retransmission irrespective of the presence or absence of the reply. With this feature, whether the facsimile apparatus automatically reminds the receiving side apparatus of the reply or not can be arbitrarily set, for example, by the user operating the selector to make a selection.

The invention is characterized in that the controlling unit of the facsimile apparatus combines the image signal stored in the storage unit so as to correspond to the identification number of the receiving side facsimile apparatus, with a predetermined image signal for indicating that the image signal is a retransmitted one, and causes the transmitting unit to transmit the composite image signal to the receiving side facsimile apparatus.

According to the invention, when the image signal is retransmitted, the controlling unit causes the composite image signal to be transmitted to the receiving side facsimile apparatus. With this feature, the image signal to be retransmitted includes a figure and the like for indicating that the image signal is a retransmitted one. Consequently, the user of the receiving side facsimile apparatus can surely recognize that the image signal is a retransmitted one by determining whether the figure and the like is included in a recording sheet of paper where the image represented by the image signal is printed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
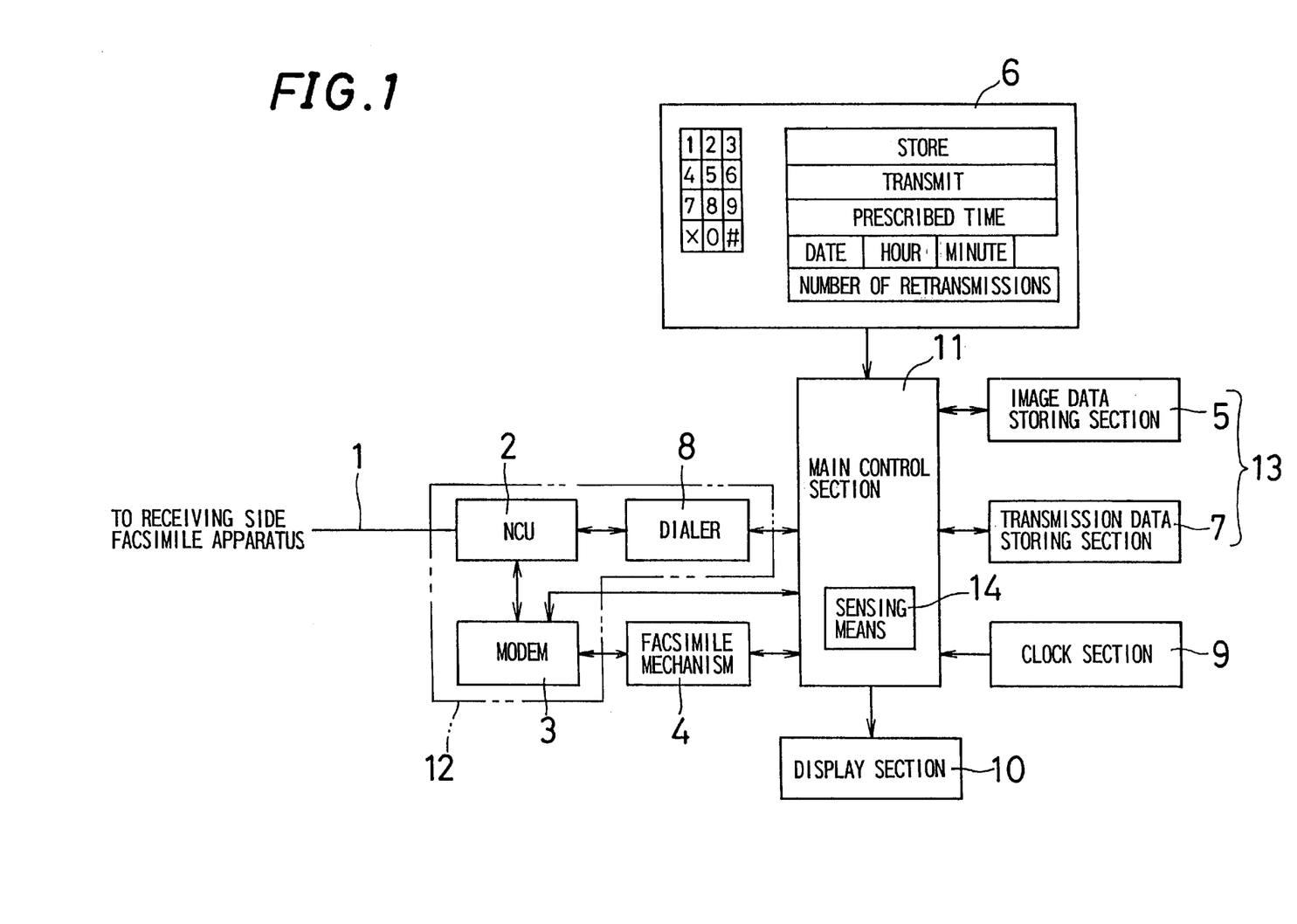
FIG. 1 is a schematic function block diagram showing an electrical construction of a facsimile apparatus according to an embodiment of the invention.

The facsimile apparatus comprises, as shown in FIG. 1, an NCU (network control unit) 2, a modem 3, a facsimile mechanism 4, an image data storing section 5, an operation section 6, a transmission data storing section 7, a dialer 8, a clock section 9, a display section 10 and a main control section 11. The facsimile apparatus is connected through a telephone line 1 and a non-illustrated exchange to another facsimile apparatus which transmits and receive image data representative of images.

The NCU 2 captures and releases the telephone line 1 and establishes a communication channel with another facsimile apparatus through the captured telephone line 1. The modem 3 transmits and receives image data to and from another facsimile apparatus by use of the communication channel established by the NCU 2. Hereinafter, the process for generating and transmitting image data will be referred to as "facsimile transmission" and the process for receiving and displaying image data will be referred to as "facsimile reception." The facsimile transmission and the facsimile reception put together will be referred to as "facsimile communication."

The facsimile mechanism 4 prints images represented by image data received by the modem 3 onto predetermined sheets of paper, reads images from originals, generates image data to be transmitted to supply to the modem 3. The image data storing section 5 stores the image data generated by the facsimile mechanism 4.

The operation section 6 comprises function keys for setting and directing various functions and numeric keys for inputting telephone numbers and time, etc. The transmission data storing section 7 stores data such as telephone numbers inputted by use of the operation section 6 and various data used for facsimile transmission. The dialer 8 performs dialing based on a telephone number inputted by use of the operation section 6 or a telephone number stored in the transmission data storing section 7. The clock section 9 counts the present time. The display section 10 displays information such as the present time counted by the clock section 9 and a telephone number.

The main control section 11 controls the capture and release of the telephone line by the NCU 2, communication with another facsimile by use of the modem 3, various operations by the facsimile mechanism 4, the storage and readout for the image data storing section 5, the storage and readout for the transmission data storing section 7, the dialing by the dialer 8 and the display by the display section 10 based on data received by the modem 3, various detection signals from the facsimile mechanism 4, various direction signals from the operation section 6, various data stored in the transmission data storing section 7 and the present time counted by the clock section 9.

The NCU 2, the modem 3 and the dialer 8 constitute a transmitting and receiving section 12 for transmitting and receiving image data between this facsimile apparatus and another facsimile apparatus. The image data storing section 5 and the transmission data storing section 7 are realized, for example, as a memory 13.

Figure 2:
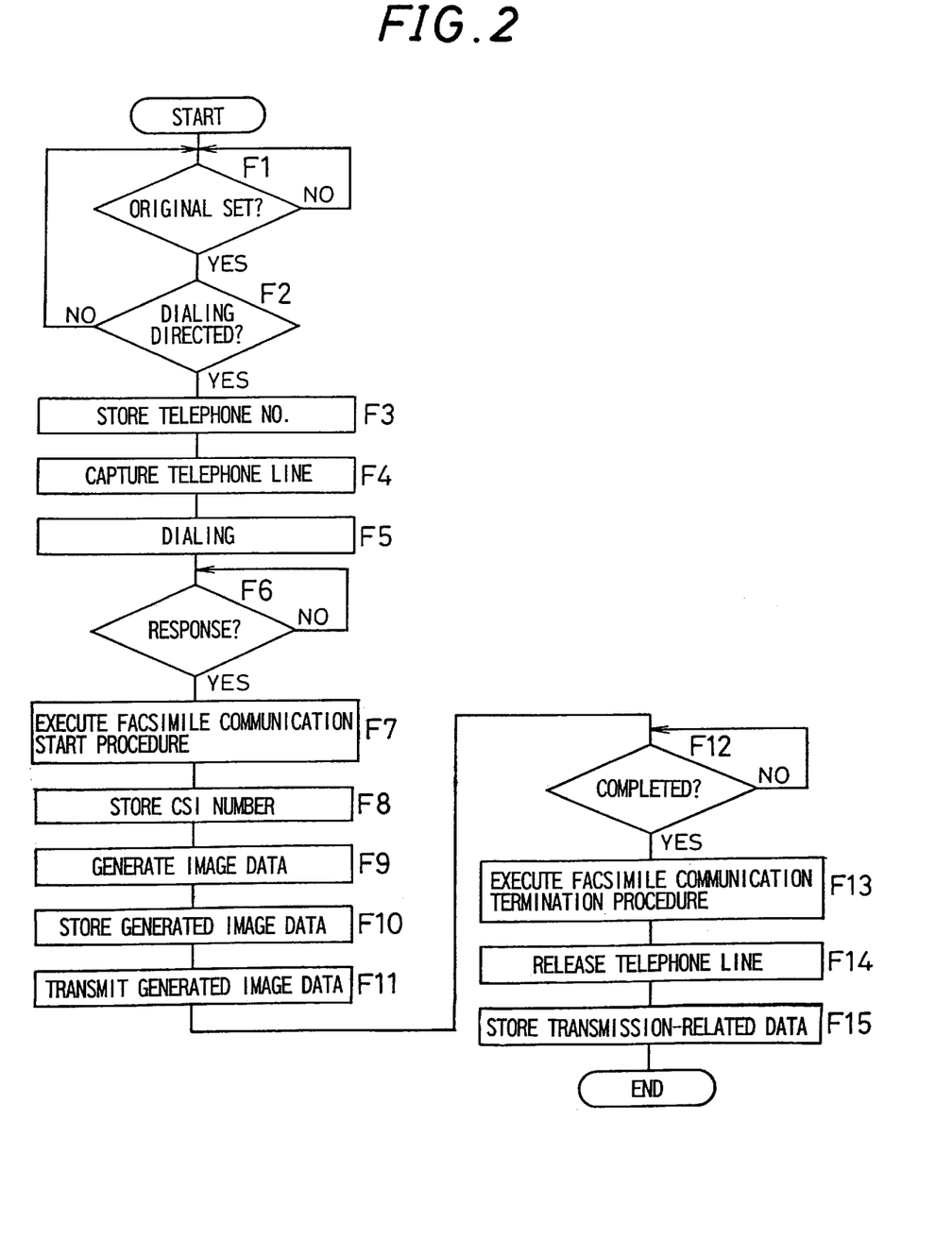
FIG. 2 is a flowchart showing a control operation in facsimile transmission in the facsimile apparatus.

With respect to the facsimile apparatus thus constructed, first, a control operation in facsimile transmission will be described with reference to the flowchart shown in FIG. 2.

A state in which neither facsimile transmission nor facsimile reception is being performed will be referred to as communication standby state. In the communication standby state, when the user of the facsimile apparatus sets an original to be transmitted at the reading section of the facsimile mechanism (step F1) and operates the operation section 6 to input the telephone number of the receiving side facsimile apparatus and to direct dialing (step F2), the main control section 11 stores the telephone number inputted by use of the operation section 6 in the transmission data storing section 7 (step F3) and controls the NCU 2 to capture the telephone line 1 (step F4). Then, the main control section 11 supplies the telephone number inputted by use of the operation section 6 to the dialer 8 to perform dialing (step F5).

The main control section 11 waits until the receiving side facsimile apparatus sends signals such as a second acknowledgment signal in response to the dialing (step F6). When the signals are transmitted, a communication channel is established between this facsimile apparatus and the receiving side facsimile apparatus through the telephone line 1.

After the communication channel is established, the main controller 11 activates the NCU 2, the modem 3 and the facsimile mechanism 4 according to a predetermined communication procedure to thereby start facsimile transmission to the receiving side facsimile apparatus (step F7). The predetermined communication procedure is, for example, the facsimile control procedure defined by CCITT (Consultative Committee for International Telegraph and Telephone) Recommendation T.30. In parallel with the transmission and reception of various control signals in the communication procedure, the main control section 11 stores in the transmission data storing section 7 a called subscriber identification (CSI) signal received in the communication procedure so as to correspond to the telephone number used for the dialing (step F8). Then, the main control section 11 controls the facsimile mechanism 4 to start the readout of the original to be transmitted being set at the reading section and to generate image data (step F9) and stores the generated image data in the image data storing section 5 so as to correspond to the CSI signal stored at step F8 (step F10). Then, the image data is modulated by the modem 3 and transmitted to the receiving side facsimile apparatus through the NCU 2 and the telephone line 1 (step F11).

Then, the main control section 11 determines whether the storage and transmission of the image data of all the originals to be transmitted from the reading section of the facsimile mechanism 4 have been completed or not (step F12). When the storage and transmission have been completed, the main control section 11 terminates the facsimile communication with the receiving side facsimile apparatus according to a predetermined communication procedure (step F13) and controls the NCU 2 to release the telephone line 1 (step F14). Then, the main control section 11 stores, in the transmission data storing section 7, the present time counted by the clock section 9, an expected time of reception obtained based on the present time, and a previously stored prescribed time, a previously stored number of retransmissions and the address number of the image data in the memory 13 so as to correspond to the CSI signal stored at step F8 (step F15). Main/control section 11 then terminates the facsimile transmission so that the facsimile apparatus is returned to the communication standby state. The expected time of reception is, for example, the time when the prescribed time has elapsed from the present time.

Thus, during facsimile transmission, in order to store a reply reminder for a receiving side facsimile apparatus in the memory 13, the transmitted image data is stored in the image data storing section 5, and the telephone number, CSI signal of the receiving side facsimile apparatus, time of transmission, expected time of reception, number of retransmissions and the address number of the image data are stored in the transmission data storing section 7. With this feature, the data used for reminding the receiving side facsimile apparatus of a reply may be stored in parallel with facsimile transmission.

Although, the prescribed time and the number of retransmissions are pre-stored in the control operation to obtain the expected time of reception, the invention is not limited thereto. For example, the expected time of reception and the number of retransmissions may be inputted by the user via operation section 6 either during or after facsimile transmission. Likewise, the prescribed time may be inputted by the user by use of the operation section 6. This is accomplished in the processing of step F15, where the main control section 11 stores expected time of reception, the number of retransmissions and the prescribed time inputted by the user in the transmission data storing section 7.

While the data is stored when facsimile transmission is performed in the operation control, whether the storage of the data is necessary or not is selected by the user, (i.e. whether the receiving side is reminded of a reply or not is selected by the user).

To accomplish the above, for example, the operation section 6 functions as a selector, (in lieu of user) to select whether the receiving side is reminded of a reply or not. When the user selects not to remind the receiving side of a reply, in response to the operation result of the operation section 6, the main control section 11 skips steps F8, F10 and F15 of the flowchart of FIG. 2 and performs only the other steps. When the user selects to remind the receiving side of a reply, all the steps of the flowchart of FIG. 2 are performed. With this feature, only the data related to the receiving side facsimile apparatus which the user selects to be reminded of a reply are stored in the image and transmission data storing sections 5 and 7.

Figure 3:
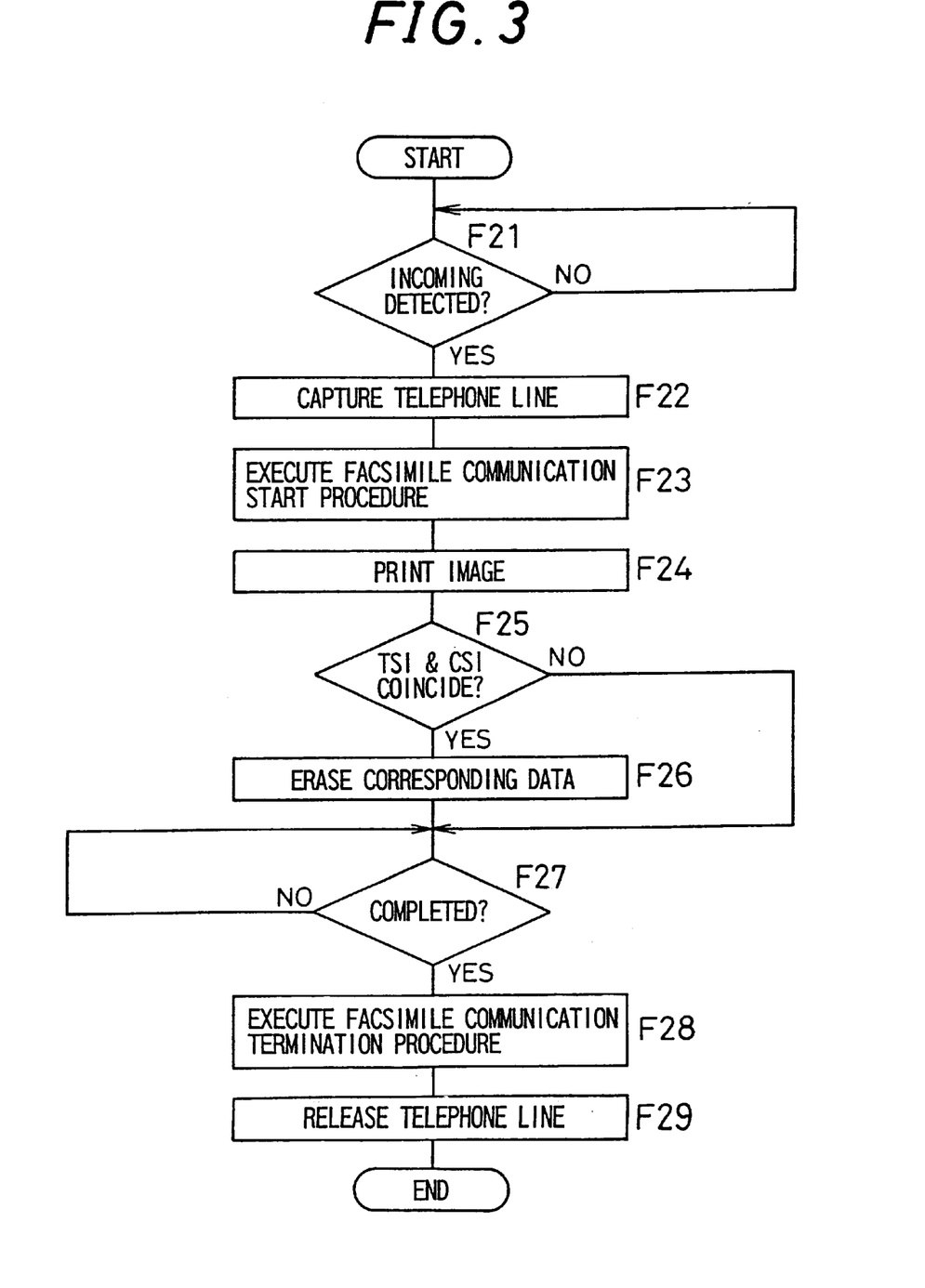
FIG. 3 is a flowchart showing a control operation in facsimile reception in the facsimile apparatus.

Next, a control operation control in facsimile reception will be described with reference to the flowchart of FIG. 3.

In the communication standby state, when there is an incoming signal such as caller information transmitted from the transmitting side facsimile apparatus and the incoming signal is detected by the main control section 11 (step F21), the main control section 11 controls the NCU 2 to capture the telephone line 1 (step F22), establishes a communication channel with the transmitting side facsimile apparatus and starts facsimile communication with the transmitting side facsimile apparatus according to a predetermined communication procedure (step F23). Then, the main control unit 11 controls the facsimile mechanism 4 to print an image represented by image data from the transmitting side facsimile apparatus demodulated by the modem 3 onto a predetermined sheet of paper (step F24).

On the other hand, the main control section 11 functions as a selector for sensing whether there is a reply from the receiving side facsimile apparatus or not. Specifically, the main control section 11 determines whether or not a CSI number which coincides with the transmitting subscriber identification (TSI) number received in the communication procedure for starting facsimile communication is stored in the transmission data storing section 7 (step F25). When a coinciding number is stored, the main control section 11 determines that there is a reply and erases the data stored in the image data storing section 5 and the transmission data storing section 7 so as to correspond to the number (step F26).

When the transmission of the image data from the transmitting side facsimile apparatus is completed (step F27), the main control section 11 terminates the facsimile communication with the transmitting side facsimile apparatus according to a predetermined communication procedure (step F28) and releases the telephone line 1 by controlling the NCU 2 (step F29) to thereby terminate the facsimile reception so that the facsimile apparatus is brought into the communication standby state.

Thus, according to the operation control, when there is a facsimile transmission from another facsimile apparatus stored as being necessarily reminded of a reply in facsimile transmission, the data may be erased which are used for reminding the facsimile apparatus of a reply. Consequently, it may be determined that there has been no reply from the facsimile apparatus the data related to which is stored in the memory 13.

While in the control operation, although the CSI number and the TSI number transmitted and received in the predetermined communication procedure are used for sensing whether there is a reply from the receiving side or not at step F25, the invention is not limited thereto. For example, the caller's telephone number included in the incoming caller information (caller ID) and the telephone number used for dialing may be used. In this case, a reply by telephone may be handled.

Next, a control operation in the communication standby state will be described with reference to the flowchart shown in FIG. 4. In the communication standby state, the main control section 11 compares the expected times of reception stored in the transmission data storing section 7 with the present time counted by the clock section 9 in order to sense whether there is a reply or not (step F31). When any of the expected times of reception is beyond the present time, it is determined that no reply is sent within the prescribed time and the facsimile apparatus retransmits the image signal. First, the main control section 11 controls the NCU 2 to capture the telephone line 1 (step F32), controls the transmission data storing section 7 to read out the telephone number corresponding to the any of the expected times of reception (step F33) and the readout telephone number is supplied to the dialer 8 to perform dialing (step F34).

Then, the main control section 11 waits until the receiving side facsimile apparatus responds to the dialing. When a communication channel with the receiving side facsimile apparatus is established through the telephone line 1 (step F35), the main control section 11 starts facsimile communication with the receiving side facsimile apparatus according to a predetermined communication procedure (step F36), reads out the address number corresponding to the telephone number used for the dialing from the transmission data storing section 7, reads out the image data corresponding to the address number from the image data storing section 5 (step F37), modulates the readout image data by the modem 3 and transmits the data to the receiving side facsimile apparatus through the NCU 2 and the telephone line 1 (step F38).

When the transmission of the image data stored in the image data storing section 5 is completed (step F39), the main control section 11 terminates the facsimile communication with the receiving side facsimile apparatus according to a predetermined communication procedure (step F40) and controls the NCU 2 to release the telephone line 1 (step F41).

After the telephone line 1 is released, the main control section 11 reads out the number of retransmissions N corresponding to the telephone number used for the dialing of the present retransmission from the transmission data storing section 7 (step F42), updates the number of retransmissions N by subtracting one from the readout number of retransmissions N (step F43) and determines whether the updated number of retransmissions N is greater than zero or not (step F44).

When it is determined that the updated number of retransmissions N is not greater than zero, the main control section 11 erases the data stored in the image data storing section 5 and the transmission data storing section 7 so as to correspond to the number of retransmissions N (step F45). When it is determined that the updated number of retransmissions N is greater than zero, the main control section 11 overwrites the present time counted by the clock section 9, the expected time of reception obtained from the present time and the previously stored prescribed time, and the updated number of retransmissions N in the transmission data storing section 7 (step F46).

Figure 5A:
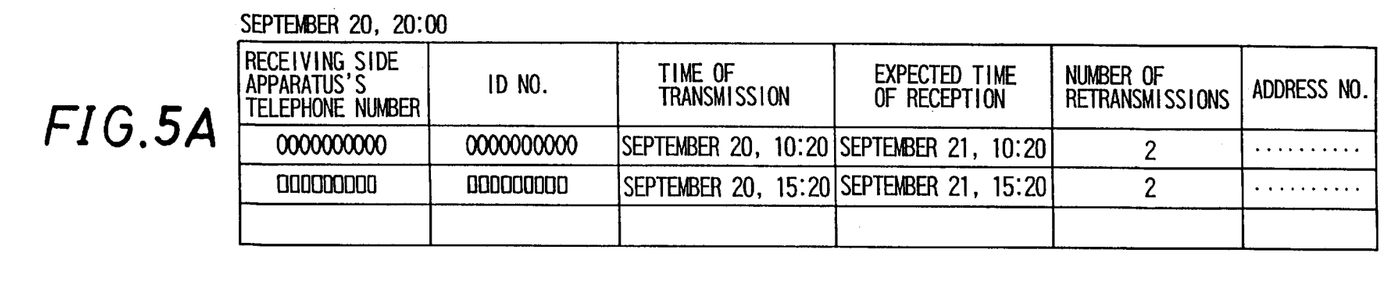
FIGS. 5A to 5C are explanatory views showing data transition in a memory 13 in the facsimile apparatus.

For example, when "24 hours" is previously stored as the prescribed time and "2" is previously stored as the number of retransmissions, it is assumed that facsimile transmission is performed to a first facsimile apparatus with a telephone number of "oo-oooo-oooo" on September 20, 10:20, facsimile transmission is performed to a second facsimile apparatus with a telephone number of "□□-□□□-□□□□" on September 20, 15:20 and each of the apparatuses is reminded of a reply. In this case, data as shown in FIG. 5A is stored in the transmission data storing section 7. The data shown in FIG. 5A is as of September 20, 20:00.

It is assumed that in the transmission data storing section 7, data is stored in the form of a table and that corresponding data is written in the same line. For example, the data on the first facsimile apparatus is written in the second line from the top, the telephone number and the CSI signal are "oooooooooo", the time of transmission is "September 20, 10:20", the expected time of reception is "September 21, 10:20", and the number of retransmissions is "2". The data on the second facsimile apparatus is written in the third line from the top, the telephone number and the CSI signal are "□□□□□□□□□", the time of transmission is "September 20, 15:20", the expected time of reception is "September 21, 15:20", and the number of retransmissions is "2". Of these data, specific values of the address numbers are not shown. The manner in which the data is stored is not limited to the table but the data may be stored in any manner. Thus, since data on a plurality of facsimile apparatuses may be stored in the memory 13, operations for reminding a plurality of facsimile apparatuses of a reply may be performed in parallel.

Figure 5B:
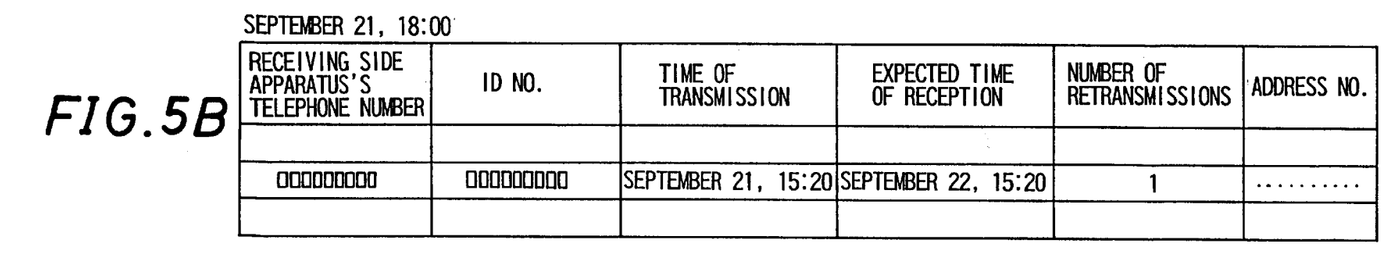

When an image signal transmitted from the first facsimile apparatus is received before September 21, 10:20 under this condition, the data in the second line shown in FIG. 5A is erased. When an image signal transmitted from the first facsimile apparatus is received before September 21, 10:20 but no image signal is received from the second facsimile apparatus before September 21, 15:20, facsimile transmission is performed again to the second facsimile apparatus at "☐☐☐-☐☐☐-☐☐☐☐" on September 21, 15:20, so that data as shown in FIG. 5B is stored in the transmission data storing section 7. The data shown in FIG. 5B is as of September 21, 18:00.

Since the data on the first facsimile apparatus has been erased in this stage, the second line from the top is blank. The data on the second facsimile apparatus is written in the third line from the top, the telephone number and the CSI signal are "☐☐☐☐☐☐☐☐", the time of transmission is "September 21, 15:20", the expected time of reception is "September 22, 15:20" and the number of retransmissions is "1". Thus, after retransmission, the time of transmission and the expected time of reception are newly set and the number of retransmissions is reduced by one.

Figure 5C:
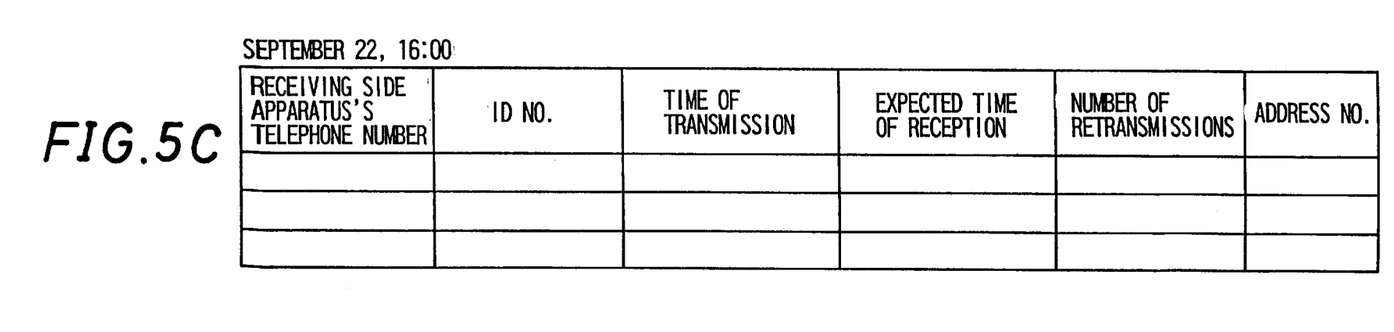

Then, when no image signal is received from the second facsimile apparatus before September 22, 15:20, facsimile transmission is performed again to the second facsimile apparatus at "☐☐-☐☐☐-☐☐☐☐" on September 22, 15:20. Since the number of retransmissions is reduced to "0" as a result of the operation for the retransmission, the data on the telephone number of the second facsimile apparatus is erased, so that all the lines in the transmission data storing section 7 are blank as shown in FIG. 5C. The data shown in FIG. 5C is as of September 22, 16:00.

Thus, according to the operation control, when a facsimile apparatus is stored, at the time of transmission, as being necessarily reminded of a reply and there is no facsimile transmission from the facsimile apparatus before the period for the reply expires, image data for reminding the facsimile apparatus of a reply may be transmitted to the facsimile apparatus.

Moreover, when the updated number of retransmissions is 0, the data stored in the transmission and image data storing sections 6 and 7 is erased. Since the main control section 11 determines whether a signal from another facsimile apparatus is received or not based on the data stored in the storing section 6, the retransmission of the image signal is not performed after the data is erased. Consequently, the retransmission of the image signal is performed only the prescribed number of retransmissions at the most. With this feature, the retransmission of the image signal is prevented from being endlessly repeated when there is no reply from another facsimile apparatus.

Although, in the control operation control, the image data transmitted first is transmitted as the image data to be retransmitted, the invention is not limited thereto. For example, composite image data may be transmitted in which an image indicating retransmission, for example, an image including letters "REMAND" is superimposed on the image transmitted first.

Figure 4:
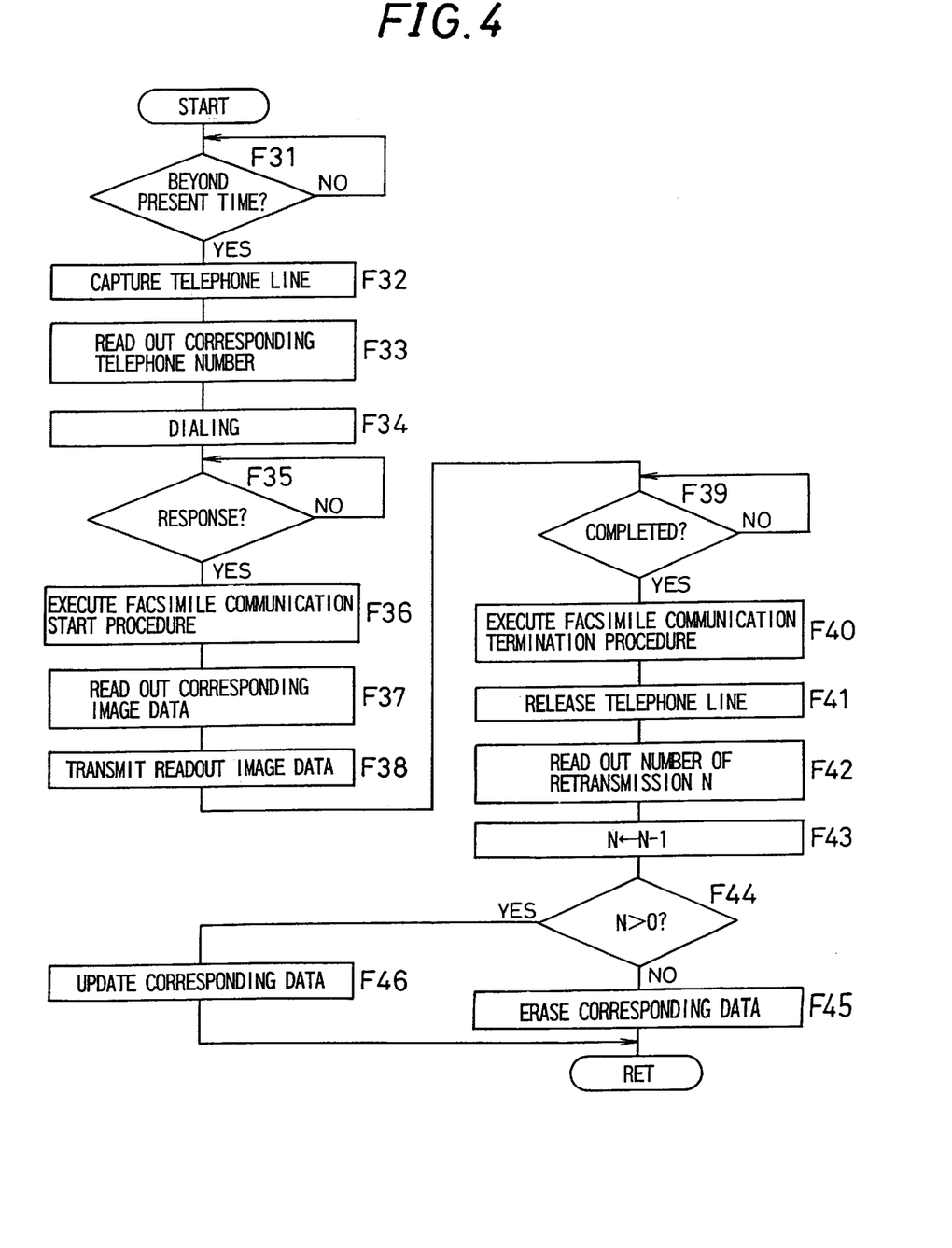
FIG. 4 is a flowchart showing a control operation in communication standby state in the facsimile apparatus.

To accomplish this, image data of the image indicating retransmission is pre-stored and the main controller 11 superimposes the pre-stored image on the image data read out at step F37 of the flowchart of FIG. 4, and transmits the composite image data at step F38. With this feature, the user of the receiving side facsimile apparatus, when looking at the sheet on which the image represented by the received image data is printed, may easily recognize that the image is a retransmitted one. Consequently, the user is easily notified that he or she is reminded of a reply.

In this embodiment, a so-called readout transmission function is used for performing facsimile transmission in the control operation control at the time of transmission, and a so-called memory transmission function is used for performing facsimile transmission in the communication standby state. At the time of facsimile transmission, the memory transmission function may be used for performing facsimile transmission. The image data transmitted is not limited to the data generated by reading the original, but may also be signals generated by a computer.

Although the above procedure to remind the receiving side of a reply when there is no reply to the transmitted information has been described with respect to a facsimile apparatus, other communication apparatuses may be used. For example, when signal for representing information is transmitted to the receiving side communication apparatus and stored in storage unit for storing, it is determined whether a signal is received from the receiving side communication apparatus within a prescribed time or not. When no signal is received, the signal for representing information is retransmitted to the receiving side communication apparatus. The signal for representing information is not limited to an image signal, but may be a signal comprising codes representative of characters and representative of sound. Moreover, instead of retransmitting the signal representative of information, a predetermined signal may be transmitted which represents that a reply is reminded of.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus comprising:
   a transmitter for transmitting a first signal representing information to be transmitted to a receiving side communication apparatus via a telephone line connected therebetween;
   a memory for storing an identification number which identifies the receiving side communication apparatus and the first signal, the memory further including a first storage unit for storing the identification number and a second storage unit for storing the first signal, wherein the identification number and the first signal relate to each other;
   a sensor for sensing an incoming second signal transmitted from the receiving side communication apparatus; and
   a controller for controlling the transmitter so that when the incoming second signal is not sensed by the sensor within a predetermined time, the transmitter retransmits the first signal stored in the second storage unit to the receiving side communication apparatus so as to correspond to the identification number of the receiving side communication apparatus, wherein retransmission of the first signal stored in the second storage unit is performed after the communication apparatus completes a communication session for transmission with the receiving side communication apparatus and the telephone line is released, thereby automatically reminding the receiving side communication apparatus of a reply to the previous transmission.

2. The communication apparatus of claim 1, wherein the predetermined time is measured from the time at which the transmitter transmits the first signal.

3. A facsimile apparatus comprising:
   a transmitter for transmitting an image signal to a receiving side facsimile apparatus via a telephone line connected therebetween;
   a memory for storing an identification number which identifies the receiving side facsimile apparatus and the image signal, the memory further including a first storage unit for storing the identification number and a second storage unit for storing the image signal, wherein the identification number and the image signal relate to each other;
   a sensor for sensing an incoming signal transmitted from the receiving side facsimile apparatus; and
   a controller for controlling the transmitter so that when the incoming signal is not sensed by the sensor within a predetermined time, the transmitter retransmits the image signal stored in the second storage unit to the receiving side facsimile apparatus so as to correspond to the identification number of the receiving side facsimile apparatus,
   wherein the retransmission of the image signal stored in the second storage unit is performed after the facsimile apparatus completes a communication session for transmission with the receiving side facsimile apparatus and the telephone line is released, thereby automatically reminding the receiving side facsimile apparatus of a reply to the previous transmission.

4. The facsimile apparatus of claim 3, wherein the predetermined time is measured from the time at which the transmitter transmits the image signal.

5. The facsimile apparatus of claim 3,
   wherein the first storage unit stores, as the identification number, a called subscriber identification signal received in a facsimile control procedure for transmitting the image signal, and
   wherein the sensor compares a transmitting subscriber identification signal transmitted from the receiving side facsimile apparatus and received in a facsimile control procedure for receiving the image signal with the called subscriber identification signal to determine whether the transmitting subscriber identification signal is transmitted from the receiving side facsimile apparatus or not, and
   wherein when it is determined that the transmitting subscriber identification signal is transmitted from the receiving side facsimile apparatus, the sensor determines that the incoming signal has arrived.

6. The facsimile apparatus of claim 3,
   wherein when the incoming signal is not sensed by the sensor within a predetermined time from the time of retransmission of the image signal by the transmitter, the controller causes the transmitter to retransmit the image signal to the receiving side facsimile apparatus again.

7. The facsimile apparatus of claim 6,
   wherein when retransmission of the image signal is repeated a predetermined number of times, the controller erases both the image signal and identification number.

8. The facsimile apparatus of claim 7, further comprising a number of times inputting unit for inputting a reference number of times,
   wherein the controlling means controls retransmission of the image signal based on the reference number of times inputted by the number of times inputting unit.

9. The facsimile apparatus of claim 3, further comprising a time inputting unit for inputting a reference time,
   wherein the controller controls timing of the retransmission of the image signal based on the reference time inputted by the time inputting unit.

10. The facsimile apparatus of claim 3,
    wherein the first storage unit stores a telephone number dialed by the transmitter to establish a communication channel with the receiving side facsimile apparatus as the identification number, and
    wherein the sensor compares a caller's telephone number included in caller information received to establish the communication channel with the telephone number to determine whether caller information is transmitted from the receiving side facsimile apparatus or not, and
    wherein when it is determined that the caller information is transmitted form the receiving side facsimile apparatus, the sensor determines that the incoming signal has arrived.

11. The facsimile apparatus of claim 3, further comprising a selector for selecting whether retransmission of the image signal is performed or not,
    wherein when the selector selects retransmission of the image signal, the memory stores the image signal and the identification number every time the transmitter transmits the image signal, and
    wherein when the selector selects not to retransmit, the image signal and identification number are not stored.

12. The facsimile apparatus of claim 3,
    wherein the controller combines the image signal stored in the second storage unit with a predetermined image signal for indicating that the image signal is a retransmitted signal, and causes the transmitter to transmit a composite image signal to the receiving side facsimile apparatus.

13. A communication method for a communication apparatus, comprising:
    transmitting a first signal representing information to be transmitted to a receiving side communication apparatus via a telephone line;
    storing an identification number, which identifies the receiving side communication apparatus and the first signal, in a memory, the memory further including a first storage unit for storing the identification number and a second storage unit for storing the first signal;
    sensing an incoming second signal transmitted from the receiving side communication apparatus; and
    retransmitting the first signal to the receiving side communication apparatus so as to correspond to the identification number of the receiving side communication apparatus, when the incoming second signal is not sensed within a predetermined time,
    wherein said retransmitting is performed after the communication apparatus completes a communication session for transmission with the receiving side communication apparatus and the telephone line is released, thereby automatically reminding the receiving side communication apparatus of a reply to the previous transmission.

14. A communication method, comprising:

transmitting an image signal to a receiving side facsimile apparatus;

storing an identification number, which identifies the receiving side facsimile apparatus and the image signal, in a memory, the memory further including a first storage unit for storing the identification number and a second storage unit for storing the image signal;

sensing an incoming signal transmitted from the receiving side facsimile apparatus with a sensor;

retransmitting the image signal to the receiving side facsimile apparatus so as to correspond to the identification number of the receiving side facsimile apparatus, when the incoming signal is not sensed within a predetermined time;

combining the image signal stored in the second storage unit with a predetermined image signal indicating a retransmitted image signal, and causing a transmission of the composite signal to the receiving side facsimile apparatus.

15. The method of claim 14, further comprising the step of selecting whether retransmission of the image signal is performed or not, wherein when selecting retransmission of the image signal is chosen, the memory stores the image signal and the identification number each time the image signal is transmitted, and wherein when selecting retransmission of the image signal is not chosen, the image signal and identification number are not stored.

16. The method of claim 14, wherein the step of sensing further includes:

comparing a transmitting subscriber signal received from the receiving side facsimile apparatus with a called subscriber identification signal stored in the first storage unit; and determining whether the transmitting subscriber signal is transmitted from the receiving side facsimile apparatus, wherein when it is determined that the transmitting subscriber signal is transmitted from the receiving side facsimile apparatus, the sensor establishes that the incoming signal has arrived.

17. The method of claim 14, further comprising the step of inputting the predetermined time, wherein timing of the retransmission of the image signal is controlled based on the inputted predetermined time.

* * * * *